United States Patent [19]
Lundqvist

[11] 3,817,361
[45] June 18, 1974

[54] HANDLE OPERATED CRANK DEVICE WITH FREEWHEEL MECHANISM

[76] Inventor: Harald Oskar Lundqvist, P.O. Box 33, Ch-6037 Root/Lucerne, Switzerland

[22] Filed: Feb. 1, 1973

[21] Appl. No.: 328,577

[30] Foreign Application Priority Data
Feb. 3, 1972  Sweden..........................1282/72

[52] U.S. Cl.................. 192/95, 74/528, 74/529, 192/67 R
[51] Int. Cl..... F16d 19/00, F16d 23/14, G05g 5/06
[58] Field of Search ...... 192/95, 67 R; 74/528, 545, 74/546, 547, 548, 550, 551, 529

[56] References Cited
UNITED STATES PATENTS

| | | | |
|---|---|---|---|
| 1,215,747 | 2/1917 | Turner | 74/546 |
| 1,315,578 | 9/1919 | Rock | 192/67 R X |
| 1,345,142 | 6/1920 | Davis | 74/550 |
| 1,851,307 | 3/1932 | Hazelton | 74/528 X |
| 2,723,011 | 11/1955 | Havir | 192/67 R X |
| 2,919,775 | 1/1960 | Wiedmann | 192/67 R X |
| 3,313,386 | 4/1967 | Schwalm | 74/545 X |

Primary Examiner—Samuel Scott
Assistant Examiner—Lance W. Chandler
Attorney, Agent, or Firm—George Vande Sande

[57] ABSTRACT

A handle operated crank device comprising a drive shaft, a crank lever provided with a handle, means for rotatably journalling the free end portion of the crank lever in a hub which is rotatably journalled on said drive shaft, an impeller member secured to the drive shaft, and a projection on said crank lever, said projection and said handle extending perpendicular to the crank lever and in one and the same plane, and said projection being adapted to engage said impeller member when the handle of said crank lever is directed substantially in parallel to said drive shaft.

4 Claims, 5 Drawing Figures

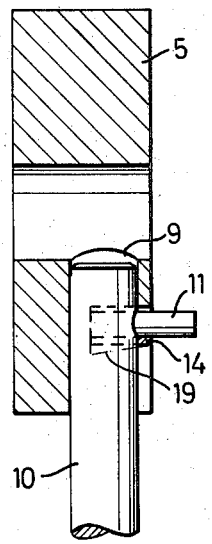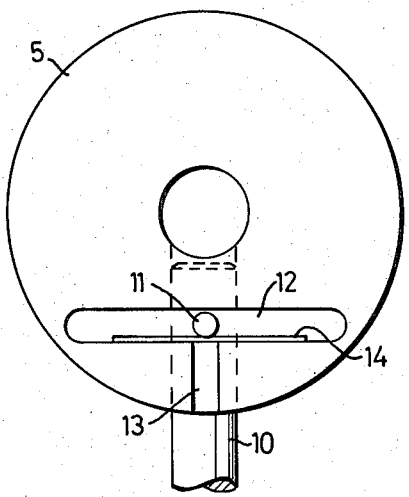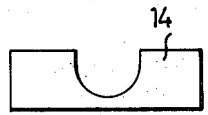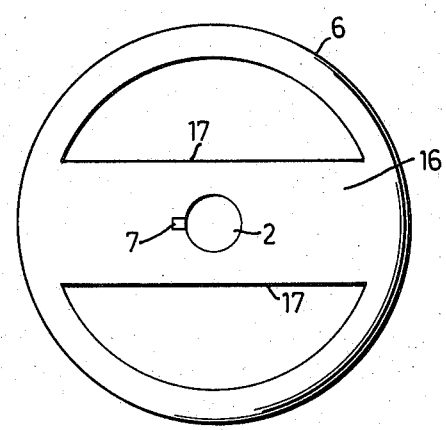

HANDLE OPERATED CRANK DEVICE WITH FREEWHEEL MECHANISM

The present invention relates to a handle operated crank device with an automatically actuated clutch mechanism, being particularly suitable for moving displaceable rail-supported shelf-stands and the like, which device includes a drive shaft, a crank lever, means for rotatable mounting said crank lever on said drive shaft, on which crank lever the handle is mounted, and clutch members connected to the drive shaft and said mounting means of the crank lever respectively, said clutch members being disengageable by altering the position of the crank lever relative to the drive shaft.

Crank devices of this type are well known, in which the crank lever incorporates a shaft member extending perpendicular to the crank lever in a direction opposite to the handle and having at some distance from the shaft end two radially projecting studs. This shaft end is adapted to be inserted into a socket secured to the outer end of the drive shaft, said socket at its edge facing the studs being provided with two notches, into which the studs are inserted by pushing the crank lever shaft inwardly to the socket while turning simultaneously the crank lever in a predetermined direction whereby the engagement of the clutch is accomplished. On turning the crank lever in a reverse direction relative to the drive shaft the studs of the crank lever together with the crank lever shaft are shifted backwards by chamfered faces of the socket notches, whereby the crank lever is disengaged from the drive shaft.

A crank device of this type presents, however, certain disadvantages. Hence, it is possible to turn the drive shaft only in one direction by means of such crank device. Moreover, the disengagement of the clutch can be accomplished only on the condition that the drive shaft rotates at higher speed than the crank lever. Otherwise, the crank lever will remain in engaged condition although the grip of the handle is loosened, which is giving cause to numerous accidents occurring when such crank devices are used as a starting-handle in connection with combustion engines. This type of crank device is unsuitable in the case of e.g., displaceable shelf-stands, on the one hand because the driving operation should be performable in both directions and, on the other hand, because the permanently projecting crank handles are liable to block the way. Instead of using handle operated crank devices, therefore, hand wheels are being used exclusively in the case of such shelf stands which is, however, inconvenient particularly in initiating the drive motion when in most cases both hands must be used to turn the wheel. Although it is known to provide crank devices for more specific use with collapsible handles, these can be used in two-way operation only where the handle is combined with locking means that have to be disengaged by hand before the handle can be folded aside. This entails that the crank device will be not only impractical as applied but also more complicated to manufacture.

The object of the present invention is to provide a simple crank device of the type introductory described above by which the disadvantages associated to the priorly known arrangements are eliminated, and more particularly a crank device incorporating a handle which will be automatically retracted when not in use.

This has been achieved in accordance with the invention in that the end portion of the crank lever is rotatably mounted in a hub, which is coaxial to the drive shaft and is freely rotatable in relation thereto with the crank lever directed substantially perpendicular to the drive shaft, and that the clutch member of the crank lever consists of a projection which projects radially from the crank lever in such a way that said projection is in an engaging position relative to the clutch member of the drive shaft when the crank lever handle is pointing substantially in parallel to the drive shaft, and so that the clutch member of the drive shaft when being pressed against said projection of the crank lever strives to turn the crank lever into a position of rotation in which the handle is located in a plane substantially perpendicular to the drive shaft.

Hence the essential feature of the invention consists therein that the crank lever with its handle, when being under a non-stressed condition and in the position of action, is turned in one direction or the other by the clutch half of the drive shaft, so that the crank handle will be folded away once a relative motion develops between the drive shaft and the freely rotatable hub of the crank lever. If both these elements are rotating when the handle grip is loosened, this will occur under actual operation immediately as the handle is released owing to the slight retardation which then arises in the crank lever due to the friction between hand and handle or, if the drive shaft is arranged horizontally, at the latest when the crank lever starts turning upwards. This effect can be promoted if the hub is retarded slightly by means of a spring washer. The same immediate effect will perform if when operating the crank device the drive shaft suddenly under steep acceleration changes its rotary direction. In the very moment the grip about the handle is released the crank lever will be rotated by the clutch member of the accelerating drive shaft so that the handle folds away and the projection of the crank lever is transferred into its non-active position.

The two clutch members and especially the one connected to the crank lever may have various designs depending primarily on the stresses that are actually applied. A construction of highest solidity is obtained by widening the end portion of the crank lever that is journalled in the hub and providing it with a projection having the shape of a wedge positioned in an axial groove. The projection may, as an alternative, consist of a pressed shoulder on the crank lever. According to a preferred embodiment of the invention the projection consists of a stud projecting perpendicular to the crank lever, while the clutch member of the drive shaft consists of a disc which is secured to the drive shaft and combined with one or more impeller means directed radially to the drive shaft and having stop faces for the stud fitted on the crank lever. Pursuant to a design of specific advantage the projection of the crank lever is arranged extending from the crank lever in the same direction as the handle. When actuating the crank device the tendency of rotation of the crank lever in the hub will then be counteracted owing to the turning moment caused by the handle and affecting the crank lever. If the length of the projection and its distance from the axis of the drive shaft are appropriately adjusted in relation to the respective lengths of the crank lever and the handle, the turning moments developed by the crank handle and the projection on the crank lever will become completely compensated.

The invention is explained more closely below with reference to the annexed drawings which illustrate an exemplifying embodiment of a crank device in accordance with the invention, wherein FIG. 1 is a lateral projection view of the crank device;

FIG. 2 is a vertical sectional view through the hub of the crank device;

FIG. 3 is an end view of the hub shown in FIG. 2;

FIG 4 shows a locking washer; and

FIG. 5 is an end view of an impeller arranged on the drive shaft of the crank device.

Figure 1:
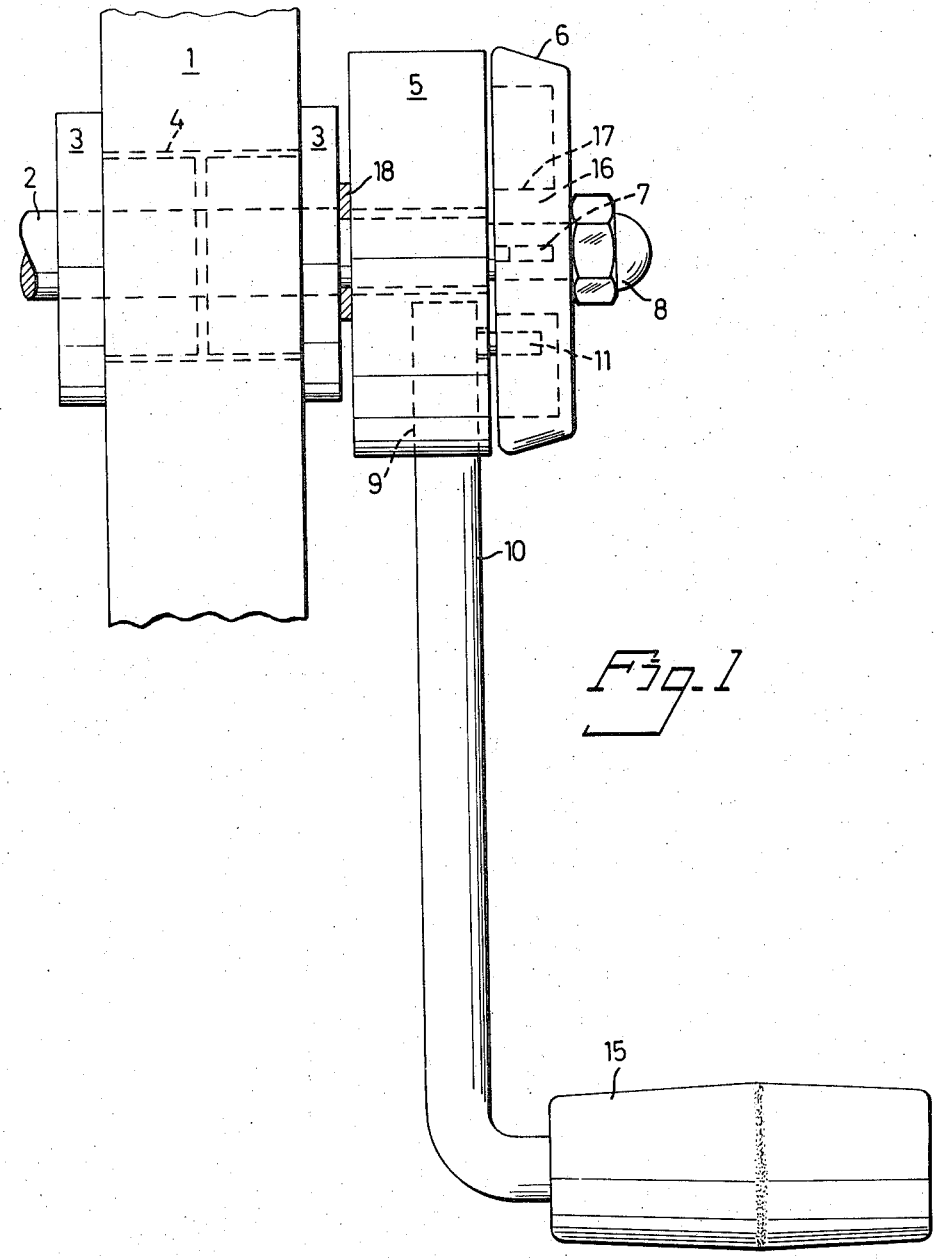

The crank device shown in FIG. 1 is mounted in an end wall 1 of a movable rail-supported shelf-stand or the like. The crank device comprises a drive shaft 2, on which a chain wheel (not shown in the drawings) of a transmission of priorly known type is fitted on the inside end wall 1. The shaft 2 is rotatably mounted in two bearing bushings 3 or the like, which are fitted in a hole 4 in the end wall 1. An impeller disc 6 is secured by a wedge 7 and a slot 8 on the shaft 2 that projects from the end wall. One end portion of a crank lever 10 is rotatably journalled in a radial bore 9 in the hub 5, said end portion having a stud 11 made of hardened steel supported in a radial bore in the crank lever. The stud 11 projects from the hub 5 through a slot 12. Another slot 13 is arranged in the hub 5 so as to enable the crank lever with the stud 11 fitted thereon to be inserted in and withdrawn from the hole 9. Upon insertion of the crank lever the slot 13 is covered by a glue jointed locking washer 14 having a recess for the crank lever 10. The slot 13 can be omitted in case the stud 11 is made detachable.

The crank lever 10 is provided with a handle 15 which extends parallel to and in the same direction as the stud 11. On turning the crank lever 10 90° in either direction from the position shown in FIG. 1 the handle 15 will be positioned in a plane perpendicular to the drive shaft 2. Simultaneously the stud 11 is shifted into the same plane, and consequently it will be positioned fully retracted into the slot 12 so that the hub 5 together with the crank lever 10 and the folded handle 15 can rotate freely about the drive shaft 2.

In the position shown in FIG. 1, however, the stud 11 projects into the impeller disc 6 that is affixed to the shaft 2 by means of the wedge 7 and provided with a diagonally arranged impeller boss 16 having stop faces 17. On turning the lever 10, the stud 11 will thus strike against one of the two stop faces 17 so that the drive shaft 2 is rotated. Since the stud 11 and the handle 15 protrude in the same direction, the turning moments produced by these elements on the lever 10 will counterbalance each other. Through appropriate adjustment of the length of the stud 11 and its space distance from the drive shaft 2 in relation to the respective lengths of the crank lever 10 and the handle 15 it is practically possible to have said turning moments fully balanced to each other. The handle 15 will then remain automatically in the outwardly turned position shown in FIG. 1, without any appreciable tendency to shift inwardly towards the uncoupled position when operating the crank device.

If the handle 15 is released while the drive shaft 2 rotates, the stud 11 on the retardation of the hub 5 relative to the shaft 2 will be shifted by the impeller boss 16 into the slot 12, resulting in disengagement of the clutch, while synchronous to the shifting of the stud 11 the lever 10 is rotated so that the handle 15 will be shifted as well inwardly towards the gable end 1. In order to facilitate the retardation of the hub 5 a spring washer 18 or the like with friction effect may be interposed between the hub 5 and one of the bushings 3.

To prevent the stud 11, when retracted into the slot 12, from swinging outwards unintentionally because of vibrations or rebounding or the like, the stud 11 can be retained in the two end positions within the slot 12 by means of e.g., small permanent magnets that are adequately arranged in the hub 5, or by using a magnetic locking washer 14. In the way of an alternative, the lower edge side of the slot 12 as well as the covering washer 14 can be arranged inwardly inclined to some extent, as indicated by the dotted line 19 in FIG. 2.

If, for some reason, the impeller boss 16 will have to be formed in the lower design than the one shown in FIG. 1 clamping effects may possibly develop between said boss and the outer end of the stud 11. On that account it may be advisable to have the impeller disc 6 arranged slidingly in a direction towards the nut 8 against the action of a rigid spring element (not shown). Alternatively or in addition, the hub 5 can likewise be arranged resilient in a direction towards the adjacent bearing bushing. It may be suitable also to arrange the impeller boss 16 as o separate member with respect to the impeller disc 6, in which case it is necessary to lock only said member on the shaft 2 by means of the wedge 7. In that case the remaining part of the impeller disc 6 will be formed as a cap that can be removed occasionally for facilitating inspection of the condition of the impeller boss 16 and the stud 11 as well as their mutual functioning during operation.

What I claim is:

1. A handle operated crank device including a clutch mechanism, particularly suitable for actuating displaceable rail-supported shelf-stands and the like, which device comprises a drive shaft, a crank lever, means for rotatably mounting said crank lever on said drive shaft on which crank lever the handle is mounted, and clutch members connected to the drive shaft and the crank lever respectively, said clutch members being disengageable by altering the position of the crank lever relative to the drive shaft, characterized in that the crank lever is rotatably journalled in a hub which is coaxial to the drive shaft and is freely rotatable in relation thereto with the crank lever extending substantially perpendicular to the drive shaft, whereas the clutch member of the crank lever consists of a projection which projects axially from the crank lever so that the projection is in engaging position relative to the clutch member of the drive shaft when the handle of the crank lever is directed substantially in parallel to the drive shaft, and so that the clutch member of the drive shaft when pressed against said projection of the crank lever strives to turn the crank lever into an angle of rotation in which the handle is located in a plane substantially perpendicular to the drive shaft.

2. A crank device according to claim 1, characterized in that the projection of the crank lever consists of a stud projecting perpendicular from the crank lever, and that the clutch member of the drive shaft consists of a disc secured to the drive shaft and provided with one or several impeller elements extending radially to the drive shaft and presenting stop faces to the stud arranged on the crank lever.

3. A crank device according to claim 1, characterized in that the projection of the crank lever is projecting from the crank lever in the same direction as the handle.

4. A crank device according to claim 1, characterized in that a resilient ring with friction effect is interposed between the hub and the support of the crank device.

* * * * *